United States Patent [19]

Perahia et al.

[11] Patent Number: 6,088,416
[45] Date of Patent: Jul. 11, 2000

[54] METHOD FOR REDUCING INTERFERENCE AND INCREASING SPECTRAL EFFICIENCY

[75] Inventors: Eldad Perahia, Hermosa Beach; Donald C. Wilcoxson, Redondo Beach; Oliver W. Saunders, Los Angeles, all of Calif.

[73] Assignee: TRW Inc., Redondo Beach, Calif.

[21] Appl. No.: 09/063,799

[22] Filed: Apr. 21, 1998

[51] Int. Cl.[7] .............................. H04L 23/00; H04Q 7/20
[52] U.S. Cl. ......................... 375/377; 455/446; 455/447; 455/448
[58] Field of Search ................................... 375/130, 377; 455/422, 427, 446, 447, 448, 449, 450, 451, 454, 12.1, 103

[56] References Cited

U.S. PATENT DOCUMENTS

| | | | |
|---|---|---|---|
| 5,924,037 | 7/1999 | Mao | 455/447 |
| 5,946,625 | 8/1999 | Hassan et al. | 455/447 |
| 5,970,411 | 10/1999 | Faruque | 455/447 |
| 5,974,323 | 10/1999 | Doner | 455/447 |

OTHER PUBLICATIONS

Synthesis of Band–Limited Orthogonal Signals for Multi-channel Data Transmission, Robert W. Chang, The Bell System Technical Journal, Dec. 1966.

*Primary Examiner*—Stephen Chin
*Assistant Examiner*—Albert Park
*Attorney, Agent, or Firm*—Michael S. Yatsko

[57] ABSTRACT

A method for reducing interference and increasing spectral efficiency in a frequency reuse pattern (600) is disclosed. The method includes the steps of generating n original communications beams (302–308) assigned to substantially non-overlapping frequency bands, with the original communications beams extending over a first set of predetermined bandwidths. The method also generates n shifted communications beams (402–408) shifted by an orthogonal frequency separation from the n original communications beams (302–308), with the n shifted communications beams (402–408) extending over a second set of predetermined bandwidths. The method projects the n original communications beams (302–308) and the n shifted communications beams (402–408) in a frequency reuse pattern (600) over a region of interest by alternating the n original communications beams (302–308) with the n shifted communications beams (402–408).

22 Claims, 3 Drawing Sheets

METHOD FOR REDUCING INTERFERENCE AND INCREASING SPECTRAL EFFICIENCY

BACKGROUND OF THE INVENTION

Modern communications systems (and satellite communications systems in particular) commonly provide bandwidth to a region of interest by dividing one or more wide bandwidth downlink beams into multiple lower bandwidth frequency components. For example, spot beams transmitted by a satellite may be assigned one of four possible frequency bands carved out of a single wide bandwidth downlink beam. The spot beams of each frequency band are assigned ideally non-overlapping and non-interfering coverage areas over the region of interest. In other words, the four frequency bands are part of a frequency reuse pattern designed to cover the region of interest.

A frequency reuse plan using four distinct frequencies is commonly referred to as a four-to-one frequency reuse pattern. A frequency reuse scheme, however, may also be implemented as three-to-one, seven-to-one, or twenty-one-to-one frequency reuse pattern. In general, frequency reuse patterns may be implemented as $(i^2+ij+j^2):1$ for any integer i,j. A frequency reuse pattern physically separates spot beams of a particular frequency band from each other using spot beams assigned to other frequency bands. For example, in a four-to-one frequency reuse pattern, a spot beam of a particular frequency band covers a cell (a portion of the region of interest). Additional spot beams then cover the six surrounding cells in an alternating scheme that guarantees that no nearest spot beam neighbors use the same frequency band. Frequency reuse patterns, however, still suffer from co-channel and adjacent channel interference (collectively "interference") which may limit the total bandwidth capacity of each frequency band.

Co-channel interference is interference generated in a spot beam assigned to a particular frequency band by nearby spot beams assigned to the same frequency band. Co-channel interference occurs even though spot beams assigned to a particular frequency band are physically separated. In part, the amount of co-channel interference depends on the number of nearby spot beams covering the same frequency band because real antennas cannot completely isolate a spot beam in a region of interest (for example, a cell).

Adjacent channel interference is interference generated in a spot beam assigned to a particular frequency band by neighboring spot beams of other frequencies. One common cause of adjacent channel interference is imperfections in the antennas used to generate the spot beams. Because virtually all antennas generate sidelobes, the energy transmitted in each spot beam is not perfectly confined to their assigned coverage area. Additionally, all real modulation techniques generate frequency sidelobes which overlap with the frequency bands of neighboring cells. As a result, spot beams may spill over in frequency into neighboring spot beams and cause adjacent channel interference.

The energy spillover effect described above is, in fact, common to both types of interference. The difference, however, is in the location of the nearby spot beams and the frequency band over which the spot beam operates. The cause of interference is the combination of the antenna effect described above and the fact that any modulation generates frequency sidelobes that are at the same frequency as the frequency band in the spot beam of interest. The effect of the antenna sidelobes is to reduce that interference by the amount of the gain of the antenna in the direction of the cell of interest.

In the past, attempts to minimize co-channel and adjacent channel interference have included expensive, complicated, and sophisticated antenna designs that minimize sidelobes and complex modulations that minimize frequency sidelobes. Even with the added complexity and expense of more sophisticated antennas, sidelobes cannot be completely eliminated. As a result, the communications system becomes much more expensive yet co-channel interference cannot be completely eliminated.

Other attempts at minimizing adjacent channel interference have included using guard bands or filters around the spot beams assigned to each particular frequency band. Guard bands, however, sacrifice useful bandwidth (thereby lowering total capacity) for dead frequency space used to reduce adjacent channel interference. In commercial communications systems (where capacity generates revenue), large guard bands are typically an undesirable alternative. Filters are also undesirable because they tend to cause signal distortion which can degrade performance and increase the complexity and expense of the communications system.

Another attempt at reducing co-channel and adjacent channel interference involves using lower frequency reuse factors. Lower frequency reuse factors reuse the same frequencies less often (geographically) and include, for example, seven-to-one and twenty-one-to-one frequency reuse factors. Lower frequency reuse factors increase the number of cells that may be used to separate other cells covering a common frequency band. Co-channel interference may therefore be reduced by increasing the physical distance between cells covering the same frequency band.

A necessary consequence of increasing the frequency reuse factor, however, is that the bandwidth of the individual spot beams is reduced. For example, in a twenty-one-to-one frequency reuse pattern, each spot beam has the bandwidth (and therefore capacity) of less than five percent ($\frac{1}{21}$) of the entire bandwidth available to the beam from which the spot beam was created. Below a certain level, the capacity of the spot beam can no longer accommodate the bandwidth requirements of the area that it is assigned to cover. As a result, a low reuse may not be an appropriate candidate for reducing interference. Furthermore, as the reuse is decreased, the antennas needed to generate the spot beams become more complicated and expensive.

A need has long existed in the industry for an improved method for reducing interference and increasing spectral efficiency.

BRIEF SUMMARY OF THE INVENTION

It is an object of the present invention to provide a method for reducing interference and increasing spectral efficiency in a communications system.

It is a further related object of the present invention to provide a frequency reuse pattern that reduces interference without reducing the bandwidth of individual communications beams.

Yet another object of the present invention is to eliminate the need for guard bands and filtering for reducing interference in a frequency reuse pattern.

It is an object of the present invention to reduce interference in a frequency reuse pattern without substantially increasing the complexity of the transmitters, antennas, and receivers used in a communications system.

It is yet another object of the present invention to provide a method for reducing interference in frequency reuse patterns $(i^2+ij+j^2):1$ (for integer i,j), for example a three-to-one (i=1, j=1), four-to-one (i=0, j=2), or seven-to-one (i=1, j=2) frequency reuse pattern.

The method of the present invention for reducing interference and increasing spectral efficiency generates n original communications beams assigned to substantially non-overlapping frequency bands. Each of the original communications beams covers an associated predetermined bandwidth. For example, a wider bandwidth of 1 GHz may be divided into four (n=4) communications beams each covering 250 MHz of bandwidth.

In addition, the method of the present invention generates n shifted communications beams whose bandwidths are equal to the n original communications beams. Each shifted communications beam typically corresponds to one of the n original communications beams shifted in frequency by an amount required to maintain an orthogonal relationship between all of the communications beams. Each of the n shifted communications beams also covers an associated predetermined bandwidth which is equal to the bandwidths of the n original communications beams. Additionally, all 2×n of the beams need to share a common clock edge; i.e., maintain symbol synchronization in order to maintain the orthogonal relationship between beams.

The method then projects the n original communications beams and the n shifted communications beams (collectively "communications beams") in a frequency reuse pattern over a region of interest. In particular, the communications beams are projected in a frequency reuse pattern that alternates the n original communications beams with the n shifted communications beams. The frequency reuse pattern distributes communications beams covering the same bandwidth over a wider physical area, thereby reducing co-channel interference. Adjacent beams that cover overlapping bandwidths are orthogonal and therefore minimize adjacent channel interference.

DETAILED DESCRIPTION OF THE INVENTION

Figure 1:
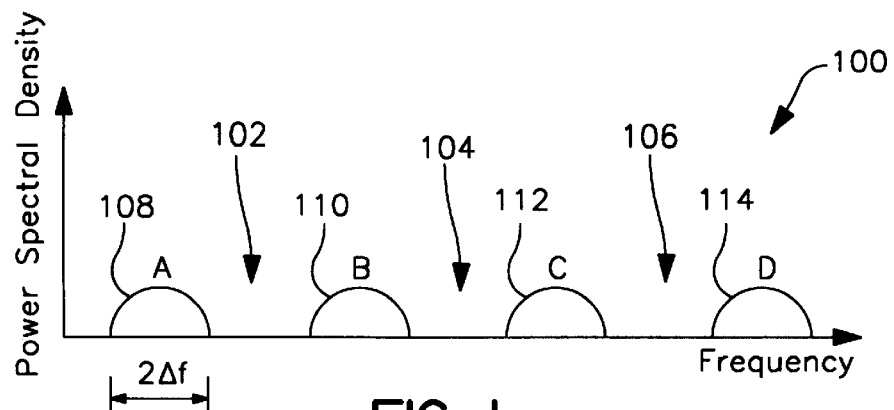
FIG. 1 shows a generic prior art frequency division plan using guard space between the bandwidths assigned to communications beams.

Turning now to FIG. 1, a generic prior art frequency division plan 100 using guard spaces 102, 104, 106 between the bandwidths assigned to four communications beams 108, 110, 112, 114 is shown. The communications beam 108 is labeled 'A', the communications beam 110 is labeled 'B', the communications beam 112 is labeled 'C', and the communications beam 114 is labeled 'D'. The labels 'A–D' will be used below to describe a frequency reuse plan for the communications beams 108–114. As noted above, the guard spaces 102–106 may be used to reduce the adjacent channel interference caused by neighboring communications beams. The guard spaces 102–106, however, sacrifice useful bandwidth (thereby lowering total capacity) for dead frequency space to reduce interference.

In order to provide useful communications service to a region of interest, the four communications beams 108–118 are projected onto a region of interest in a four-to-one frequency reuse pattern. However, the four communications beams 108–118 in the generic prior art frequency division plan shown in FIG. 1 suffer from significant co-channel interference when they are projected in a four-to-one frequency reuse pattern. The generic prior art four-to-one frequency reuse pattern is more clearly illustrated in FIG. 2.

Figure 2:
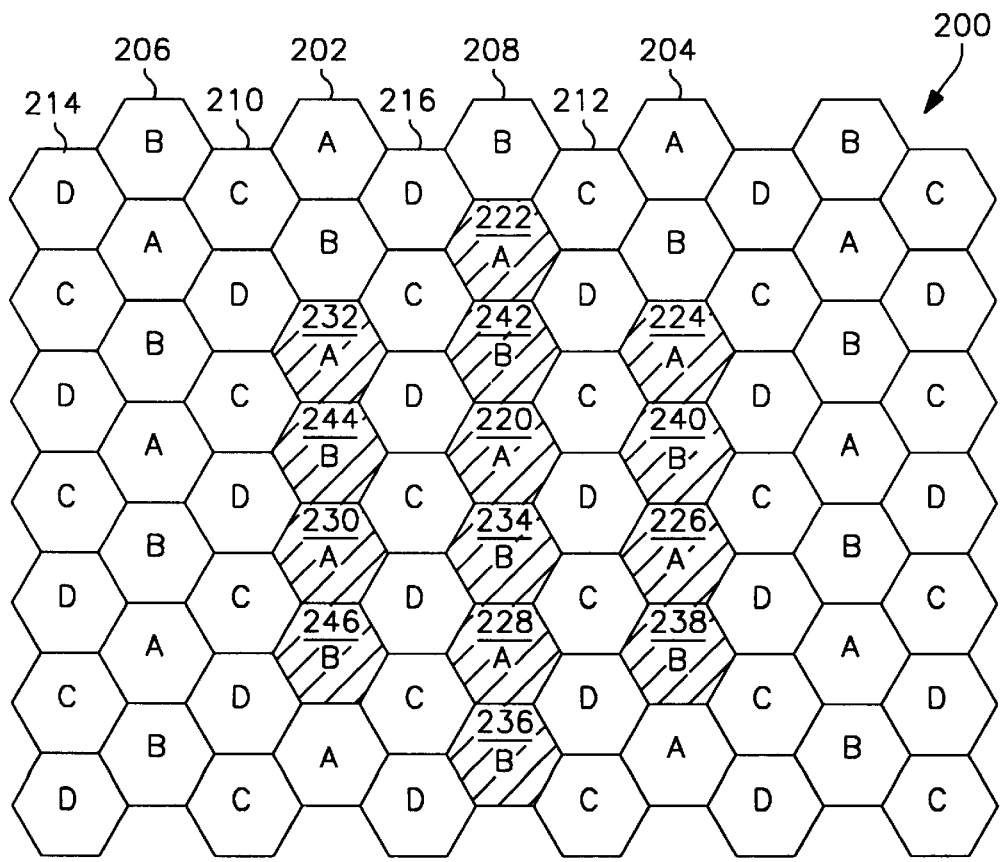
FIG. 2 shows a generic prior art four-to-one frequency reuse pattern and associated interfering co-channel and adjacent channel communications beams.

FIG. 2 shows a four-to-one frequency reuse pattern 200 formed from discrete geographic regions commonly referred to as cells. The cells in which the bandwidth covered by communications beam 108 is projected are labeled 'A', for example, cells 202 and 204. The cells in which the bandwidth covered by communications beam 110 is projected are labeled 'B', for example, cells 206 and 208. The cells in which the bandwidth covered by communications beam 112 is projected are labeled 'C', for example, cells 210 and 212. The cells in which the bandwidth covered by communications beam 114 is projected are labeled 'D', for example cells 214 and 216.

Each of the four communications beams 108–118 are assigned to cells such that no two nearest neighboring cells are covered by communications beams covering the same bandwidth. In other words, two 'A' cells are never next to one another, nor are two 'B' cells, two 'C' cells, nor two D cells. The guard spaces 102–106 between the communications beams 108–114 attempt to reduce the adjacent channel interference between neighboring cells. For example, the guard space 106 provides dead frequency space into which the transmitted bandwidth covering the 'D' cell 214 and the 'C' cell 218 may encroach (due to the nature of practical modulation methods and their implementation) without causing adjacent channel interference.

However, the four-to-one frequency reuse pattern 200 shown in FIG. 2 creates a pattern in which every cell has six nearby cells covered by a communications beam covering same frequency band ("co-channels"). Each cell in FIG. 2 thereby suffers from co-channel interference caused by the six nearby co-channels. For example, 'A' cell 220 is surrounded by six interfering 'A' cells 222–232 and 'B' cell 234 is surrounded by six interfering 'B' cells 236–246. The method of the present invention reduces the number of co-channels to only two (in a four-to-one frequency reuse pattern), thereby significantly reducing co-channel interference.

Figure 3:
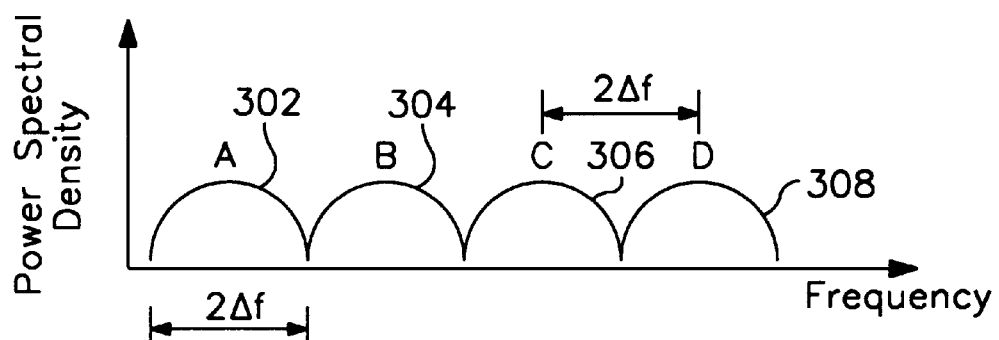
FIG. 3 illustrates a set of four original communications beams assigned to substantially non-overlapping frequency bands of bandwidth 2Δf.

Turning now to FIG. 3, four original communications beams 302 ('A'), 304 ('B'), 306 ('C'), and 308 ('D') according to the present invention are shown assigned to non-overlapping frequency bands of bandwidth 2Δf. The original communications beams 302–308 are generated using orthogonal signaling techniques to eliminate adjacent channel interference while allowing tight frequency spacing of the carriers used to modulate the original communications beams 302–308. As an example, the original communications beams 302–308 may be generated using orthogonal frequency division multiplexing (OFDM) techniques that maintain orthogonality between communications beams. OFDM techniques have been precisely analyzed in the literature, for example, in *Synthesis of Band-Limited Orthogonal Signals for Multi-channel Data Transmission*, The Bell System Technical Journal (December 1966), by Robert W. Chang (the entirety of which is incorporated herein by reference).

The original communications beams 302–308 are modulated with carriers at a frequency separation (and a common symbol synchronization) that maintains orthogonality between the original communications beams 302–308. The frequency separation depends on the modulation used on the original communications beams 302–308. For example, in Phase Shift Keying (PSK), a frequency separation of 1/T Hz (where T is the symbol duration) produces the minimum orthogonal frequency spacing, $\Delta f$. Frequency separations that are multiples of $\Delta f$ also maintain the orthogonal signaling structure. Therefore, the carriers may alternatively be placed at multiples of the minimum orthogonal frequency spacing.

For example, the carriers may be spaced at $2\Delta f$, thereby relaxing the timing and frequency constraints necessary to maintain near orthogonal conditions. More closely spaced carriers (e.g., those spaced at $\Delta f$) require much more stringent timing and frequency constraints to maintain near-orthogonality and relatively minor imperfections in the timing and frequency circuits can cause severe interference between carries. For example, as shown in FIG. 3, the original communications beams 302–308 have a null-to-null bandwidth of $2\Delta f$. Each original communications beam 302–308 is spaced at $2\Delta f$ from each other original communications beam 302–308. Thus, the orthogonality of the original communications beams 302–308 is maintained.

Figure 4:
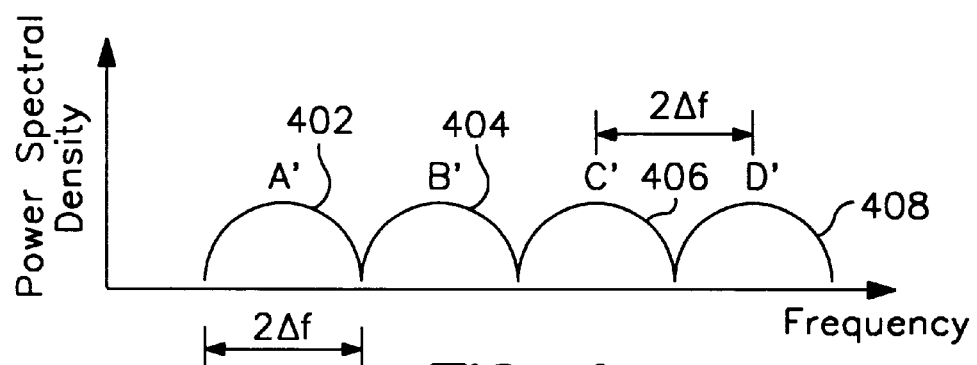
FIG. 4 illustrates a set of four shifted communications beams shifted from the four original communications beams by Δf and assigned to substantially non-overlapping frequency bands of bandwidth 2Δf.

Turning now to FIG. 4, a set of four shifted communications beams 402 ('A*'), 404 ('B*'), 406 ('C*'), and 408 ('D*') is shown. The four shifted communications beams 402–408 are similar to the four original communications beams 302–308, except shifted in frequency from the original communications beams 302–308 by the minimum orthogonal frequency spacing $\Delta f$. Although the four shifted communications beams 402–408 are shown shifted up in frequency by $\Delta f$, they may alternatively be shifted up in frequency by multiples of $\Delta f$ or down in frequency by multiples of $\Delta f$.

Figure 5:
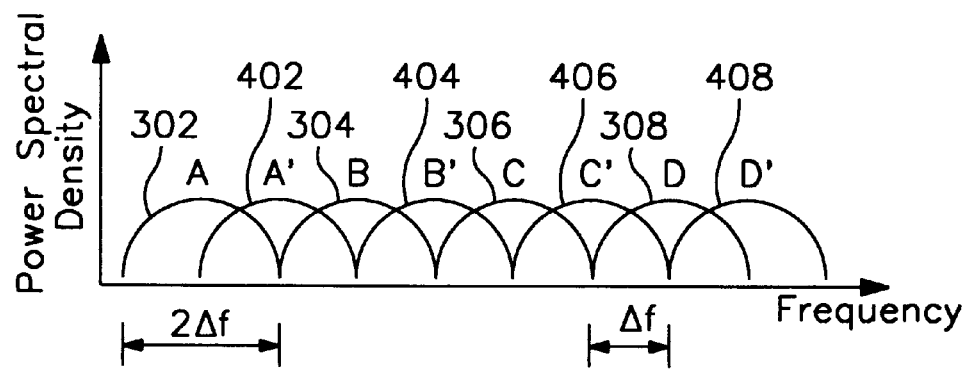
FIG. 5 shows a composite frequency plan including four original communications beams and four shifted communications beams.

FIG. 5 shows a composite frequency plan including the four original communications beams 302–308 and the four shifted communications beams 402–308. Because all of the communications beams 302–308 and 402–408 are separated from one another by $\Delta f$, or multiples of $\Delta f$, orthogonality is maintained between all of the communications beams 302–308 and 402–408. As a result, eight orthogonal communications beams, A, A*, B, B*, C, C*, D, D*, covering eight overlapping bandwidths are available for use in a frequency reuse pattern. Each of the bandwidths covered by the communications beams 302–308 and 402–408 is twice as wide as the bandwidths for communications beams that would have been generated by dividing a single wide bandwidth into eight non-overlapping sub-bands.

Figure 6:
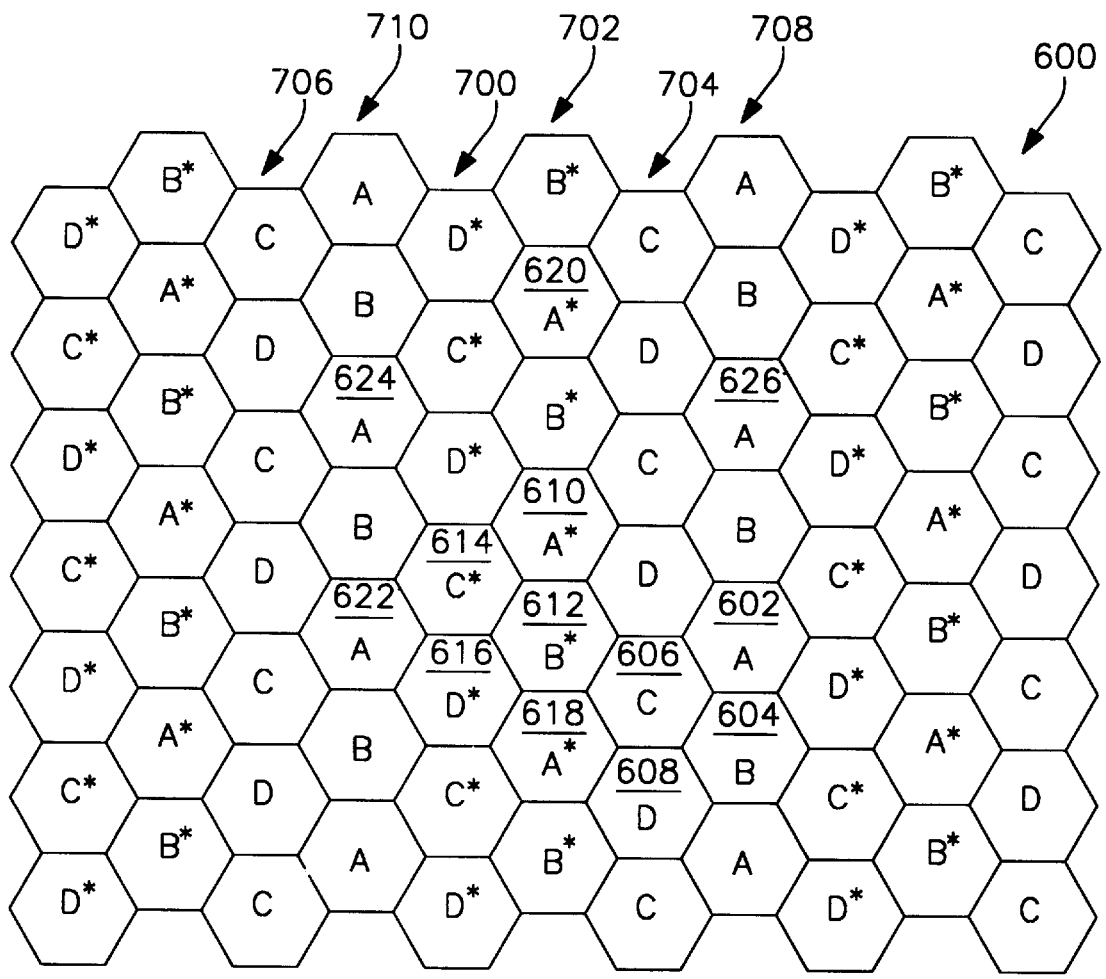
FIG. 6 illustrates an improved frequency frequency reuse pattern incorporating four original communications beams and four shifted communications beams.

Turning now to FIG. 6, one example is shown of a frequency reuse pattern 600 using the communications beams 302–308 and 402–408. The frequency reuse pattern 600 includes cells covered by the bandwidths assigned to the original communications beams 302–308 and also includes cells covered by the bandwidths assigned to the shifted communications beams 402–408. In general, the cells in which the bandwidth covered by the communications beam 302 is projected are labeled 'A', for example, cell 602. The cells in which the bandwidth covered by the communications beam 304 is projected are labeled 'B', for example, cell 604. The cells in which the bandwidth covered by the communications beam 306 is projected are labeled 'C', for example, cell 606. The cells in which the bandwidth covered by communications beam 308 is projected are labeled 'D', for example cell 608.

Furthermore, the cells in which the bandwidth covered by the shifted communications beam 402 is projected are labeled 'A*', for example, cell 610. The cells in which the bandwidth covered by the shifted communications beam 404 is projected are labeled 'B*', for example, cell 612. The cells in which the bandwidth covered by the shifted communications beam 408 is projected are labeled 'C*', for example, cell 614. The cells in which the bandwidth covered by the shifted communications beam 408 is projected are labeled 'D*', for example cell 616.

The frequency reuse pattern 600 may be formed by alternating the bandwidths assigned to the original communications beams 302–308 with the bandwidths assigned to the shifted communications beams 402–408. For example, a column of C*, D* cells 700 and a column of A*, B* cells 702 may be alternated between columns of C, D cells 704, 706 and columns of A, B cells 708, 710. Alternating column schemes may be used for all frequency reuse patterns to reduce the number of co-channel interfering beams from 6 to 2.

Similar to the frequency reuse pattern 200 shown in FIG. 2, each of the eight communications beams 302–308 and 402–408 are assigned to cells such that no two nearest neighboring cells are covered by communications beams covering the same bandwidth. In other words, two A or A* cells are never next to one another, nor are two B or B* cells, two C or C* cells, nor two D or D* cells. Furthermore, although several pairs of bandwidths (A and A*, A* and B, B and B*, B* and C, C and C*, C* and D, D and D*) are overlapping in frequency (though still orthogonal), all pairs except B* and C are always separated by at least one cell. For example, D cell 608 and D* cell 616 are separated by A* cell 618. The physical space between overlapping pairs of bandwidths insures low adjacent channel interference.

Unlike the frequency reuse pattern 200 in FIG. 2, however, the frequency reuse pattern 600 shown in FIG. 6 creates a pattern in which every cell has only two nearby cells, rather than six nearby cells, covered by exactly the same bandwidth. For example, 'A*' cell 610 is only nearby 'A*' cell 618 and 'A*' cell 620. The four nearby 'A' cells 602, 622, 624, and 626, as noted above, are shifted away from 'A*' by $\Delta f$. Each cell in FIG. 6 thereby experiences a dramatically reduced amount of co-channel interference.

FIG. 6 illustrates only one possible configuration of the bandwidths generated by the frequency shifting scheme disclosed above. Many other permutations of the A, A*, B, B*, C, C*, and D, D* bandwidths having the same advantages disclosed above are also possible. In addition, it is not necessary that a single antenna or transmitter generate the communications beams covering all the cells shown in FIG. 6. In most instances, multi-feed antennas, several antennas, or transmitters will generate communications beams with the appropriate bandwidths to provide coverage for all of the cells in a frequency reuse pattern. Furthermore, and as noted above, the orthogonal frequency shifting scheme disclosed above is applicable to frequency reuse patterns $(i^2+ij+j^2):1$ in general and is not restricted to three-to-one, four-to-one, seven-to-one, or twenty-one-to-one frequency reuse patterns.

While particular elements, embodiments and applications of the present invention have been shown and described, it will be understood, of course, that the invention is not limited thereto since modifications may be made by those skilled in the art, particularly in light of the foregoing instruction. It is therefore contemplated by the appended claims to cover such modifications as incorporate those features which come within the spirit and scope of the invention.

What is claimed is:

1. A method for reducing interference and increasing spectral efficiency in a frequency reuse pattern, the method comprising the steps of:
   a. generating n original communications beams assigned to substantially non-overlapping frequency bands, said original communications beams extending over a first set of predetermined bandwidths;
   b. generating n shifted communications beams shifted by an orthogonal frequency separation from said n original communications beams, said n shifted communications beams extending over a second set of predetermined bandwidths; and
   c. projecting said n original communications beams and said n shifted communications beams in a frequency reuse pattern over a region of interest by alternating said n original communications beams with said n shifted communications beams.

2. The method of claim 1, wherein said orthogonal frequency separation is a minimum orthogonal frequency separation.

3. The method of claim 1, wherein said n shifted communications beams are shifted up in frequency by said orthogonal frequency separation.

4. The method of claim 3, wherein said orthogonal frequency separation is a minimum orthogonal frequency separation.

5. The method of claim 1, wherein said n shifted communications beams are shifted down in frequency by said orthogonal frequency separation.

6. The method of claim 5, wherein said orthogonal frequency separation is a minimum orthogonal frequency separation.

7. The method of claim 1, wherein $n=(i^2+ij+j^2)$ for integer i,j.

8. The method of claim 7, wherein n=3.

9. The method of claim 7, wherein n =4.

10. The method of claim 7, wherein n=7.

11. The method of claim 7, wherein n=21.

12. A satellite communications method for reducing interference and increasing spectral efficiency in a frequency reuse pattern, the method comprising the steps of:
   a. providing at least one transmitting antenna on-board a satellite.
   b. generating n original communications beams assigned to substantially non-overlapping frequency bands, each of said original communications beams extending over a first set of predetermined bandwidths;
   c. generating n shifted communications beams shifted by an orthogonal frequency separation from said n original communications beams, each of said n shifted communications beams extending over a second set of predetermined bandwidths; and
   d. projecting, with said at least one transmitting antenna, said n original communications beams and said n shifted communications beams in a frequency reuse pattern over a region of interest by alternating said n original communications beams with said n shifted communications beams.

13. The method of claim 12, wherein said orthogonal frequency separation is a minimum orthogonal frequency separation.

14. The method of claim 12, wherein said n shifted communications beams are shifted up in frequency by said orthogonal frequency separation.

15. The method of claim 14, wherein said orthogonal frequency separation is a minimum orthogonal frequency separation.

16. The method of claim 12, wherein said n shifted communications beams are shifted down in frequency by said orthogonal frequency separation.

17. The method of claim 16, wherein said orthogonal frequency separation is a minimum orthogonal frequency separation.

18. The method of claim 12, wherein $n=(i^2+ij+j^2)$ for integer i,j.

19. The method of claim 18, wherein n=3.

20. The method of claim 18, wherein n=4.

21. The method of claim 18, wherein n=7.

22. The method of claim 18, wherein n=21.

* * * * *